United States Patent
Tracht

(10) Patent No.: US 7,331,601 B2
(45) Date of Patent: Feb. 19, 2008

(54) VEHICLE SEAT COMPONENT SIDE AIR BAG MODULE HAVING AIR BAG GUIDE INCLUDING FLEXIBLE INNER AND OUTER PANELS ATTACHED TO SEAT PAD ATTACHMENT WIRES

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 427 days.

(21) Appl. No.: 10/904,858

(22) Filed: Dec. 1, 2004

(65) Prior Publication Data

US 2006/0113773 A1 Jun. 1, 2006

(51) Int. Cl.
*B60R 21/16* (2006.01)

(52) U.S. Cl. .................. 280/730.2; 280/728.2

(58) Field of Classification Search ............. 280/730.1, 280/730.2, 728.3, 728.2, 743.1
See application file for complete search history.

(56) References Cited

U.S. PATENT DOCUMENTS

| 5,498,030 | A | | 3/1996 | Hill et al. |
|---|---|---|---|---|
| 5,678,853 | A | | 10/1997 | Maly |
| 5,749,597 | A | | 5/1998 | Saderholm |
| 5,762,363 | A | | 6/1998 | Brown et al. |
| 5,816,610 | A | | 10/1998 | Higashiura et al. |
| 5,860,673 | A | | 1/1999 | Hasegawa et al. |
| 5,863,063 | A | | 1/1999 | Harrell |
| 5,893,579 | A | * | 4/1999 | Kimura et al. ........... 280/730.2 |
| 5,927,749 | A | | 7/1999 | Homier et al. |
| 5,938,232 | A | | 8/1999 | Kalandek et al. |
| 5,967,546 | A | | 10/1999 | Homier et al. |
| 5,967,603 | A | | 10/1999 | Genders et al. |
| 5,988,674 | A | * | 11/1999 | Kimura et al. ........... 280/730.2 |
| 6,045,151 | A | | 4/2000 | Wu |
| 6,237,934 | B1 | | 5/2001 | Harrell et al. |
| 6,357,789 | B1 | | 3/2002 | Harada et al. |
| 6,386,577 | B1 | * | 5/2002 | Kan et al. ................ 280/730.2 |
| 6,578,911 | B2 | * | 6/2003 | Harada et al. ......... 297/216.13 |
| 6,588,838 | B1 | | 7/2003 | Dick, Jr. et al. |

FOREIGN PATENT DOCUMENTS

DE 299 23 578 U1 12/2000
EP 0 856 439 A1 8/1998

OTHER PUBLICATIONS

U.S. Appl. No. 08/808,572, filed Feb. 28, 1997, Wu et al.

* cited by examiner

*Primary Examiner*—Paul N. Dickson
*Assistant Examiner*—Tiffany L. Webb
(74) *Attorney, Agent, or Firm*—Brooks Kushman P.C.

(57) ABSTRACT

A vehicle seat component (18) includes a side air bag module (18) mounted on a frame (24) within a trim cover (34) that also covers a seat pad (30). An air bag guide (44) includes flexible inner and outer panels (46,48) that extend between a release seam (36) of the trim cover (34) and the air bag module (18) to provide a guiding function to an air bag (42) thereof as it is inflated upon deployment so as to project outwardly through the release seam (36) for use. Inner extremities (52,56) of the flexible inner and outer panels (46,48) are respectively secured by first and second connectors (68,70) to attachment wires (64,66) that are molded in the seat pad (36) at spaced locations from each other.

10 Claims, 3 Drawing Sheets

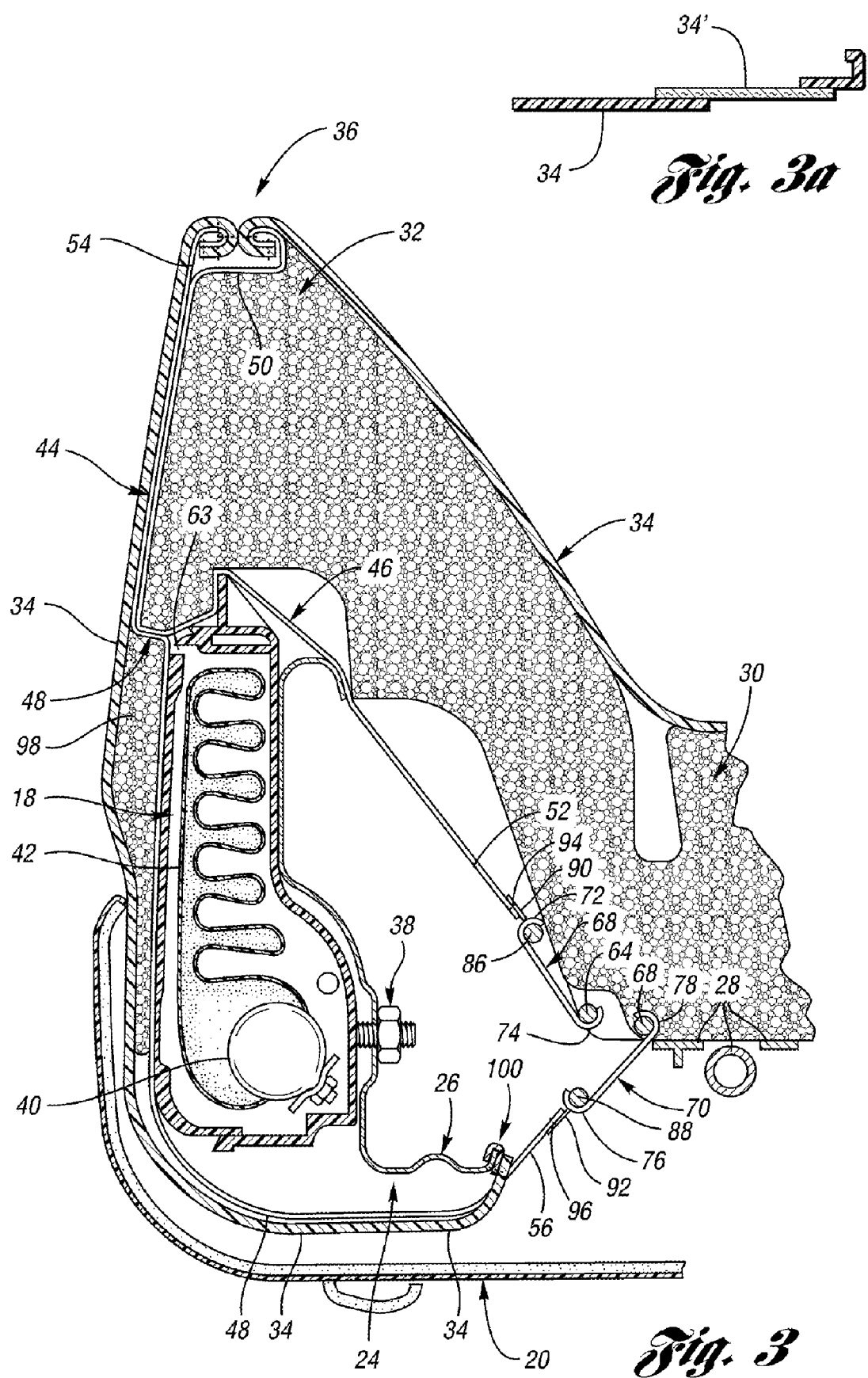

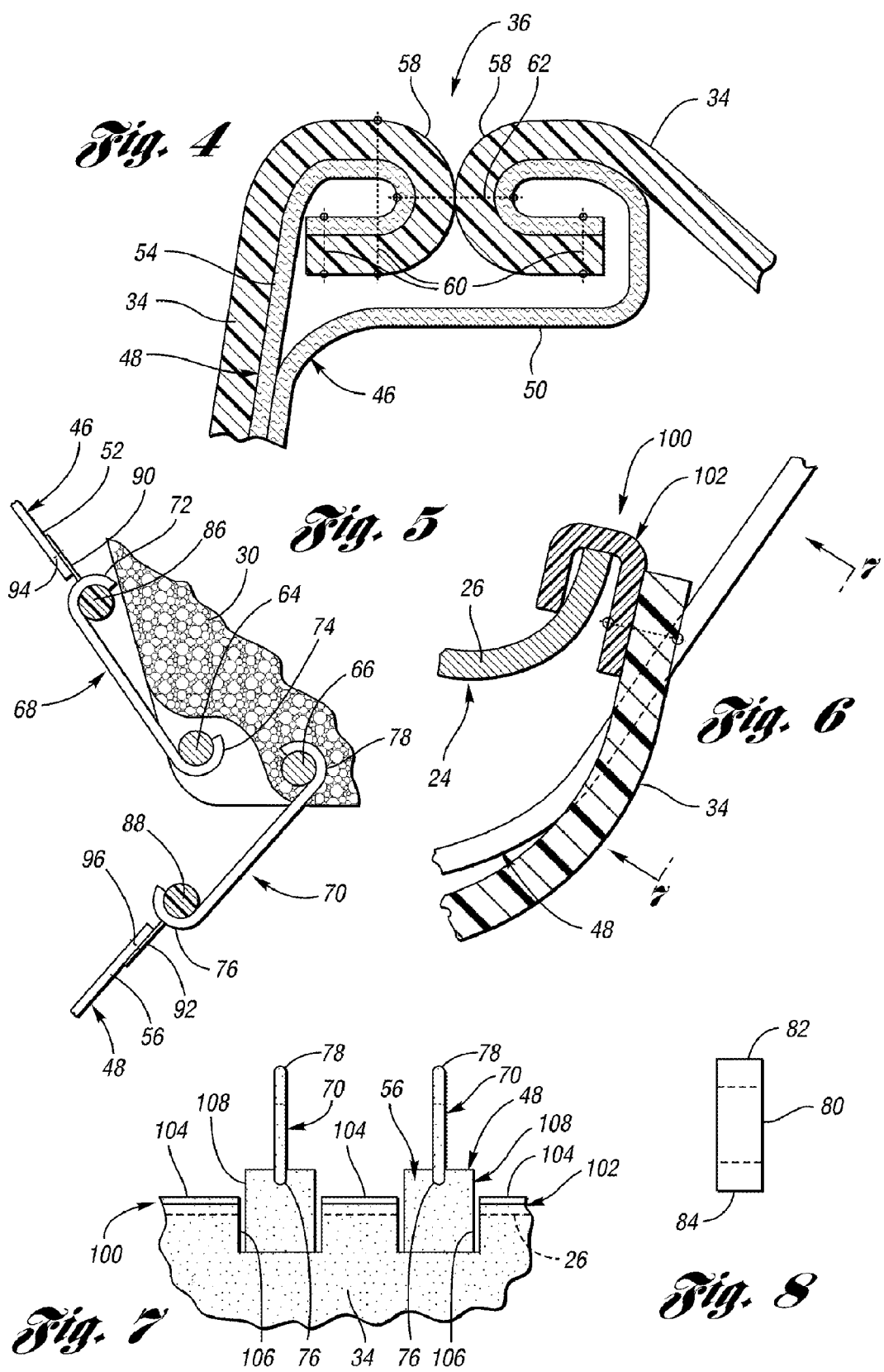

VEHICLE SEAT COMPONENT SIDE AIR BAG MODULE HAVING AIR BAG GUIDE INCLUDING FLEXIBLE INNER AND OUTER PANELS ATTACHED TO SEAT PAD ATTACHMENT WIRES

BACKGROUND OF THE INVENTION

1. Field of the Invention

This invention relates to a vehicle seat component side air bag module having an air bag guide with flexible inner and outer panels having inner extremities secured to attachment wires of a seat pad of the seat component.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflater from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

SUMMARY OF THE INVENTION

An object of the present invention is to provide an improved vehicle seat side air bag module for providing seat occupant protection.

A vehicle seat component constructed in accordance with the invention includes a frame for mounting on an associated vehicle on which the vehicle seat component is to be used. A molded foam seat pad is mounted by the frame and has a side extremity, and the seat pad includes attachment wires molded in the seat pad. A trim cover extends over the seat pad and has an air bag release seam adjacent the side extremity of the seat pad. An air bag module is mounted on the frame within the trim cover in a spaced relationship from its air bag release seam. The air bag module includes an inflater and an air bag that is inflated by the inflater and projected outwardly from the seat component through the air bag release seam of the trim cover. An air bag guide of the seat component includes an inner panel and an outer panel that are each made of flexible material and have outer and inner extremities with their outer extremities connected to the trim cover adjacent the air bag release seam. The flexible inner and outer panels extend alongside each other from their outer extremities to the air bag module and thence respectively inwardly and outwardly of the air bag module. A first connector secures the inner extremity of the flexible inner panel to one of the attachment wires of the seat pad, and a second connector secures the inner extremity of the flexible outer panel to another one of the attachment wires of the seat pad in a spaced location from the inner extremity of the flexible inner panel.

The flexible inner panel extends from its outer extremity to the air bag module and thence in a skewed angular relationship from the air bag module to the first connector.

The flexible outer panel extends from its outer extremity to the air bag module and thence along the air bag module to the second connector.

The first and second connectors are each selected from the group consisting of: wires, plastic strips and combinations of wires and plastic strips.

The flexible outer panel and the trim cover extend along the air bag module with a portion of the seat pad therebetween, with the flexible outer panel and the trim cover extending around the air bag module, and with a third connector that secures the trim cover to the frame.

The third connector includes a hook shaped retainer that secures the trim cover to the frame.

The air bag release seam includes stitching through bent seam ends of the trim cover and through the outer extremities of the flexible inner and outer panels.

The vehicle seat component has particular utility as a seat back, especially with its one side extremity at an outboard location to provide protection from adjacent vehicle structure.

The objects, features and advantages of the present invention are readily apparent from the following detailed description of the preferred embodiment when taken in connection with the accompanying drawings.

BRIEF DESCRIPTION OF THE DRAWINGS

FIG. 3 is a partial sectional view taken through the seat back component along the direction of line 3-3 in FIG. 2 to further illustrate the construction of the side air bag module within the seat back component at its outboard side.

FIG. 3a is a partial view illustrating a modification of a trim cover which includes an extension for attachment to a frame of the seat back component.

FIG. 4 is an enlarged view of a portion of FIG. 3 illustrating an air bag release seam of a trim cover of the seat back component.

FIG. 5 is a partial view of a portion of FIG. 3 but taken on an enlarged scale to illustrate the manner in which first and second connectors secure inner extremities of flexible inner and outer panels of an air bag guide of the seat back component.

FIG. 6 is also a partial view of a portion of FIG. 3 taken on an enlarged scale to illustrate the manner in which a third connector secures a trim cover of the seat back component.

FIG. 7 is a view taken along the direction of line 7-7 in FIG. 6 to further illustrate the manner in which the inner extremity of the flexible outer panel of the air bag guide and the trim cover are secured.

FIG. 8 illustrates another embodiment of the first and second connectors that is constructed as a plastic strip as opposed to the wire constructions illustrated in FIGS. 5 and 7.

DETAILED DESCRIPTION OF THE PREFERRED EMBODIMENT

Figure 1:
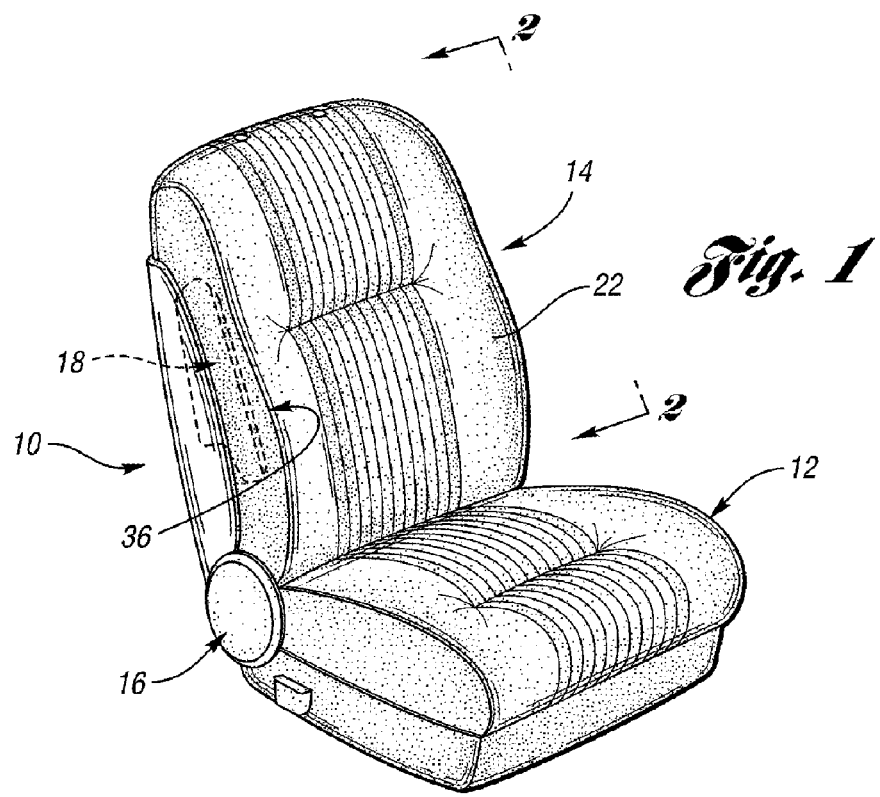
FIG. 1 is a perspective view of a vehicle seat including a seat back component constructed in accordance with the invention to include a side air bag module that is shown by hidden line illustration.
Figure 2:
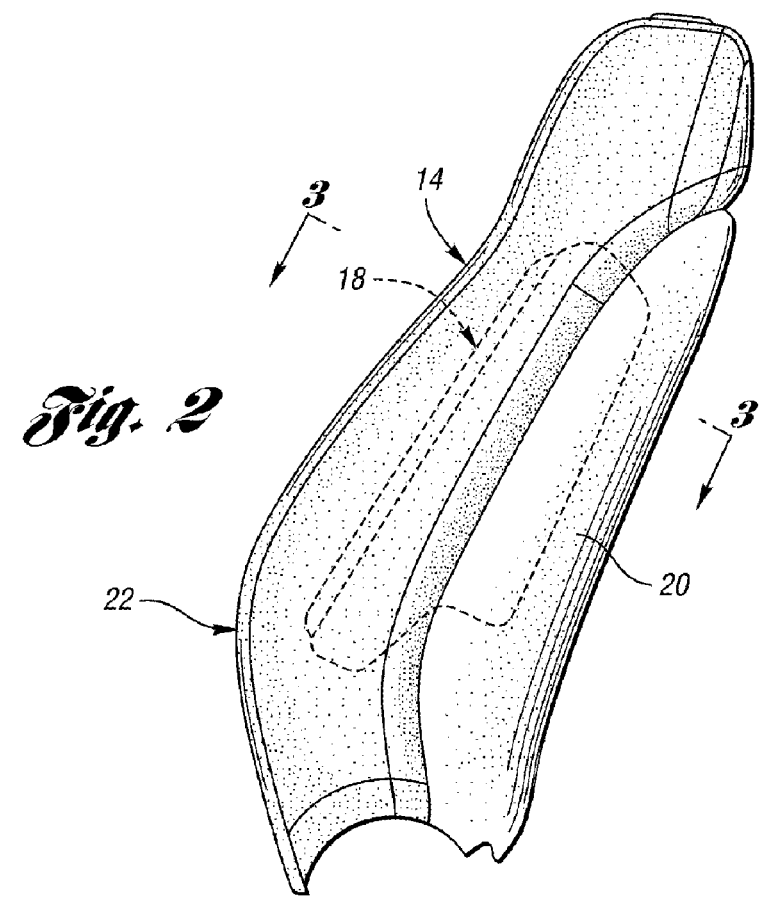
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

As shown in FIG. 3, the seat back component 14 includes a frame collectively identified by 24 and having a pair of frame members 26 (only one shown) at its opposite lateral sides as well as having frame tubes and other components all of which are identified by 28. A foam seat pad 30 is mounted on the frame 24 in any conventional manner and has opposite side extremities 32 spaced laterally from each other at the opposite lateral sides of the seat. A trim cover generally indicated by 34 extends over the seat pad 30 and includes an air bag release seam 36 adjacent the left side extremity 32 of the seat pad which, as previously mentioned, corresponds to an outboard location. The side air bag module 18 is located within the trim cover 34 mounted on the frame 24, specifically by a threaded connector 38 on the illustrated side frame member 26 adjacent the air bag release seam 36 but in a spaced relationship from the release seam. The air bag module 18 includes an inflater 40 and a schematically illustrated air bag 42 which may be folded or rolled and, upon deployment, the air bag is inflated by the inflater to project outwardly from the seat component through the air bag release seam 36 of the trim cover 34.

The trim cover 34 may be made of cloth, vinyl or leather, etc. In some embodiments, the trim cover 34 within the back panel 20 includes an extension 34' secured thereto by stitching and/or adhesive, etc. for securement to the seat component structure as is hereinafter described. Such trim cover extensions can be made of any sufficiently strong and flexible material and can reduce the total cost of the trim cover without losing any aesthetic appeal since the back panel 20 hides the trim cover extension.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 36 and also has an inner extremity 52 as is hereinafter more fully described. The flexible outer panel 48 has an outer extremity 54 adjacent the air bag release seam 36 and has an inner extremity 56 which is hereinafter more fully described.

As shown in FIG. 4, the air bag release seam 36 includes bent seam ends 58 of the trim cover 34 and the outer extremities 50 and 54 of the flexible inner and outer panels 46 and 48. Stitching 60 provides securement of the flexible panel outer extremities 50 and 54 to the trim cover 34 and stitching 62 provides securement of the bent ends 58 to each other.

From the air bag release seam 36 illustrated in FIG. 4, the flexible inner and outer panels 46 and 48 extend alongside each other as shown in FIG. 3 from their outer extremities 50 and 54 to the side air bag module 18 and thence inwardly and outwardly thereof for connection within the seat back component as is hereinafter more fully described. Upon deployment of the side air bag module 18, the air bag 42 moves through a module opening 63 and thence between the flexible inner and outer panels 46 and 48 which then provide a guiding function of the air bag 42 as it moves between the panels toward the air bag release seam 36 and eventually tears open the release seam for outward projection of the air bag to provide the occupant protection. The inner and outer flexible panels 46 and 48 may be made of any suitable flexible material effective to guide the air bag 42 from the module to the release seam. For example, a woven or non-woven cloth material, which may include natural materials or a synthetic material such as nylon. One material that is found to be effective is a polyester material of the type from which the air bag 42 may be manufactured. Regardless of the type of material used to make the air bag guide 44, the use of the air bag guide can be helpful in reducing friction on the air bag 42 as it is deployed. Although a polymer such as nylon may be particularly beneficial, even a fleece material will help reduce the friction on the air bag 42 because the air bag guide 44 prevents contact between the deploying air bag 42 and the seat pad 30.

As illustrated in FIGS. 3 and 5, the seat pad 30 includes first and second attachment wires 64 and 66 that are molded in the foam pad and spaced from each other. A first connector 68 secures the inner extremity 52 of the air bag guide flexible inner panel 46 to the first attachment wire 64 of the seat pad 30. A second connector 70 secures the inner extremity 56 of the air bag guide flexible outer panel 48 to the second attachment wire 66 of the seat pad 30 in a spaced location from the inner extremity 52 of the flexible inner panel 46. First and second connectors 68 and 70 thus secure the flexible inner and outer panels 46 and 48 of the air bag guide 44 during the deployment of the air bag 42 as it is inflated by the inflater 40 and guided outwardly to the release seam 36 for outward projection to provide occupant protection.

As previously described in connection with FIG. 3, the flexible inner and outer panels 46 and 48 extend from their outer extremities 50 and 54, respectively, adjacent the air bag release seam 36 of the trim cover 34 alongside each other to the air bag module 18. The flexible inner and outer panels 46 and 48 then extend as previously described inwardly and outwardly of the air bag module 18 with the flexible inner panel 46 extending in a skewed angular relationship from the air bag module 18 to the first connector 68. The flexible outer panel 48 extending from its outer extremity separates from the inner panel and extends along the air bag module 18 to its second connector 70.

As shown in FIGS. 5 and 7, the first and second connectors 68 and 70 each are illustrated with a pair of opposite ends 72, 74 and 76, 78 that are respectively secured to the flexible inner and outer panel inner extremities 52, 56 and to the first and second attachment wires 64 and 66. These first and second connectors 68 and 70 can be constructed as wires as illustrated in FIGS. 5 and 7 or as plastic strips 80 with hooked ends at 82 and 84 as illustrated in FIG. 8. The inner extremities 52 and 54 of the flexible inner and outer panels 46 and 48 are illustrated with respective attachment beads 86 and 88 from which webs 90 and 92 extend for securement by stitching 94 and 96. Suitable openings in the attachment webs 90 and 92 receive the respective hooked ends 72 and 76 of the first and second connectors 68 and 70. It is also possible for the wire connectors to each have a C shape that is deformed upon assembly to a closed shape around both the associated seat pad attachment wire and the attachment bead of the associated flexible panel inner extremity being secured, such C-shaped wire connectors being referred to as "hog rings" in the vehicle industry.

As shown in FIG. 3, the flexible outer panel 48 and the trim cover 34 extend along the air bag module 18 with a portion 98 of the seat pad 30 therebetween. On the opposite side of the air bag module 18 from the release seam 36 shown in FIG. 3, the flexible outer panel 48 and the trim cover 34 extend around the air bag module and a third connector 100 shown in FIG. 6 secures the trim cover to the frame 24 at its adjacent frame member 26. The third connector includes a hook shaped retainer 102 which, as shown in FIG. 7, includes portions 104 that are spaced from each other. Spaced openings 106 in the trim cover extremity 34 permit spaced portions 108 of the flexible outer panel inner extremity 56 to extend therethrough past the frame member 26 to the associated seat pad attachment wire as previously described.

While the side air bag module 18 described above had particular utility for use with a vehicle seat back, especially at its outboard location, it is also possible for the side air bag to be utilized with other vehicle seat components such as with a seat bottom.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat component comprising:
   a frame for mounting on an associated vehicle on which the vehicle seat component is to be used;
   a molded foam seat pad mounted by the frame and having a side extremity, and the seat pad including attachment wires molded in the seat pad;
   a trim cover extending over the seat pad and having an air bag release seam adjacent the side extremity of the seat pad;
   an air bag module mounted on the frame within the trim cover in a spaced relationship from its air bag release seam, and the air bag module including an inflater and an air bag that is inflated by the inflater to project outwardly from the seat component through the air bag release seam of the trim cover;
   an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof;
   a first connector for securing the inner extremity of the flexible inner panel to one of the attachment wires in the seat pad; and
   a second connector for securing the inner extremity of the flexible outer panel to another one of the attachment wires in the seat pad at a location that is spaced from the inner extremity of the flexible inner panel.

2. A vehicle seat component as in claim 1 wherein the flexible inner panel extends from its outer extremity to the air bag module and thence from the air bag module to the first connector that is attached to the one in situ molded attachment wire of the seat pad.

3. A vehicle seat component as in claim 1 wherein the flexible outer panel extends from its outer extremity to the air bag module and thence along the air bag module to the second connector.

4. A vehicle seat component as in claim 1 wherein: the flexible inner panel extends from its outer extremity to the air bag module and thence relationship to the first connector; and the flexible outer panel extends from its outer extremity to the air bag module and thence along the air bag module to the second connector.

5. A vehicle seat component as in claim 1 wherein the first and second connectors are each selected from the group consisting of: wires, plastic strips and combinations thereof.

6. A vehicle seat component as in claim 1 wherein the flexible outer panel and the trim cover extend along the air bag module with a portion of the seat pad therebetween, the flexible outer panel and the trim cover extending around the air bag module, and a third connector that secures the trim cover to the frame.

7. A vehicle seat component as in claim 6 wherein the third connector includes a hook shaped retainer that secures the trim cover to the frame.

8. A vehicle seat component as in claim 1 wherein the air bag release seam includes stitching through bent seam ends of the trim cover and through the outer extremities of the flexible inner and outer panels.

9. A vehicle seat component as in claim 1 embodied as a seat back and wherein the one side extremity is at an outboard location.

10. A vehicle seat back comprising:
    a frame for mounting on an associated vehicle on which the vehicle seat back is to be used;
    a molded foam seat pad mounted by the frame and having a side extremity, and the seat pad including attachment wires molded in the seat pad;
    a trim cover extending over the seat pad and having an air bag release seam adjacent the side extremity of the seat pad;
    an air bag module mounted on the frame within the trim cover and spaced from the air bag release seam of the cover, and the air bag module including an inflater and an air bag that is inflated by the inflater to project outwardly from the seat back through the air bag release seam of the trim cover;
    an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof with the flexible inner panel extending from the air bag module and with the flexible outer panel extending along the air bag module with a portion of the seat pad positioned located outwardly thereof and adjacent the trim cover;
a first connector for securing the inner extremity of the flexible inner panel to one of the in situ molded attachment wires in the seat pad; and a second connector for securing the inner extremity of the flexible outer panel to another one of the attachment wires in the seat pad at a location spaced from the inner extremity of the flexible inner panel.

* * * * *